United States Patent [19]

Storage

[11] Patent Number: 5,286,071
[45] Date of Patent: Feb. 15, 1994

[54] BELLOWS SEALED BALL JOINT

[75] Inventor: Michael R. Storage, Beavercreek, Ohio

[73] Assignee: General Electric Company, Cincinnati, Ohio

[21] Appl. No.: 983,950

[22] Filed: Dec. 1, 1992

[51] Int. Cl.⁵ .................. F16L 51/02; F16L 27/04
[52] U.S. Cl. .................. 285/226; 285/264; 285/261; 285/360
[58] Field of Search .............. 285/226, 264, 360, 421, 285/261, 299, 322

[56] References Cited

U.S. PATENT DOCUMENTS

| | | | |
|---|---|---|---|
| 2,500,720 | 3/1950 | van der Heem | 285/332 |
| 2,613,087 | 10/1952 | Alford | 285/92 |
| 2,910,308 | 10/1959 | Carr | 285/27 |
| 3,219,365 | 11/1965 | Webb | 285/226 X |
| 3,770,303 | 11/1973 | Hallett | 285/226 X |
| 4,165,107 | 8/1979 | Affa et al. | 285/41 |
| 4,350,372 | 9/1982 | Logsdon | 285/226 X |
| 4,508,373 | 4/1985 | Ward | 285/226 |
| 4,643,463 | 2/1987 | Halling et al. | 285/226 |
| 4,856,822 | 8/1989 | Parker | 285/264 X |
| 4,893,847 | 1/1990 | Hess | 285/226 |
| 5,069,486 | 12/1991 | Kimura et al. | 285/264 |

FOREIGN PATENT DOCUMENTS

| | | | |
|---|---|---|---|
| 137602 | 5/1948 | Australia | 285/226 |
| 609137 | 11/1960 | Canada | 285/226 |
| 413263 | 5/1925 | Fed. Rep. of Germany | |

Primary Examiner—Randolph A. Reese
Assistant Examiner—Heather Chun
Attorney, Agent, or Firm—Jerome C. Squillaro

[57] ABSTRACT

A bellows sealed ball joint comprising an inner spherical shell, a bellows and an outer spherical shell. The inner spherical shell comprises a plurality of elongated non-spherical areas or indentations which receive a plurality of locking surfaces on the outer spherical shell. The inner and outer spherical shells can then be rotated with respect to each other a predetermined distance until the spherical locking surfaces on the outer spherical shell operatively engage concentric spherical locking surfaces on the inner spherical shell. Once the locking surfaces of the inner and outer spherical shells are in operative engagement, the bellows ball joint can pivot freely without becoming disconnected. A final joining seal is then made at each end of the bellows to prevent the spherical sections from unlocking and to provide a hermetic seal. In an alternate embodiment, the inner spherical shell is shown as having elongated slots in place of the non-spherical areas. A support ring may also be used to facilitate supporting the locking surfaces on the outer spherical shell against the locking surfaces of the inner spherical shell.

13 Claims, 6 Drawing Sheets

BELLOWS SEALED BALL JOINT

BACKGROUND OF THE INVENTION

1. Field of the Invention

This invention relates to a bellows sealed ball joint and, more particularly, to a bellows ball joint for use in a gas turbine engine.

2. Description of Related Art

In the design of gas turbine engines, bellows sealed ball joints are often used in ducting systems of the gas turbine engine. Typically, a bellows sealed ball joint is used to provide a flexible joint with leak proof angulation. The bellows sealed ball joint provides flexibility which may be required in order to physically deflect the ducting line so as to improve installation ease with other parts of the turbine engine and, primarily, to accommodate thermal growth in the ducting line.

A typical bellows ball joint comprises an inner shell or ball, an outer shell or socket, and a bellows. A problem common to all bellows ball joints is in getting the bellows inside both the ball and socket of the ball joint. A typical manner in which this was done was to simply cut an outer spherical section of the socket, insert the bellows in the ball portion of the joint, insert the ball and bellows inside the socket, and then weld the outer spherical section back together. A disadvantage with this approach is that welding the outer spherical section back together is time consuming and costly and often distorts the spherical form of the outer shell such that the ball and socket sections no longer angulate freely.

German Patent Specification No. 413263, issued on May 4, 1925, discloses a ball joint having a bellows therein. The ball joint comprises a smaller hollow element C having a catch hook C1. An outer hollow element comprises a catch hook C2 and a plurality of slits C4. The slits C4 enable the catch hook C1 of the smaller hollow element to be inserted therein and rotated such that when the ball joint flexes the catch hook C1 and C2 cooperate to ensure that the smaller and larger hollow elements do not become disconnected. A problem with this design and structure is that the catch hooks C1 and C2 are subjected to considerable force and stress when the ball joint is pivoted. In addition, the catch hooks C1 and C2 require additional material and complicate the manufacturing of the smaller and larger hollow elements.

What is needed is an inexpensive and lightweight flexible bellows ball joint which can be easily assembled and wherein the force between the outer and inner shells is distributed evenly over the spherical surfaces of the shell when the ball joint pivots.

SUMMARY OF THE INVENTION

Accordingly, a primary object of this invention is to provide a bellows ball joint comprising an inner spherical shell and an outer spherical shell which can be easily coupled together without having to cut and weld the outer spherical shell or provide catch hooks on the inner and outer spherical shells.

Another object is to provide a ball joint wherein the pivoting force between the inner and outer spherical shells is distributed evenly across the spherical surfaces of the inner and outer spherical shells.

In accordance with one aspect of the invention, this invention consists of a bellows sealed ball joint comprising an inner spherical section comprising a first end and a second end, said first end being spherically shaped and having a first plurality of spherical locking surfaces; an outer spherical section comprising a first end and a second end, said first end of said outer spherical section being spherically shaped and having a second plurality of spherical locking surfaces, said inner and outer spherical sections cooperating to define a chamber when said outer spherical section is mounted on said inner spherical section; a bellows for mounting in said chamber between said second ends of said inner and outer spherical members, respectively; and means located on said inner spherical section for receiving said second plurality of spherical locking surfaces in order to permit said inner and outer spherical sections to become locked when they are rotated a predetermined distance with respect to each other, thereby encasing the bellows in said chamber.

In this design, a final joining (i.e., weld, braze, or the like) of each end of the bellow to the respective spherical segments is made to provide a leak tight seal and to prevent the spherical segment from ever unlocking.

Another object of this invention is to provide a bellows ball joint design which enables the inner and outer shells to be assembled such that they become coupled without the need for any structural weld, catch hook, or lip.

These advantages, and others, may be more readily understood in connection with the following specification, claims, and drawing.

DETAILED DESCRIPTION OF THE INVENTION

Figure 1:
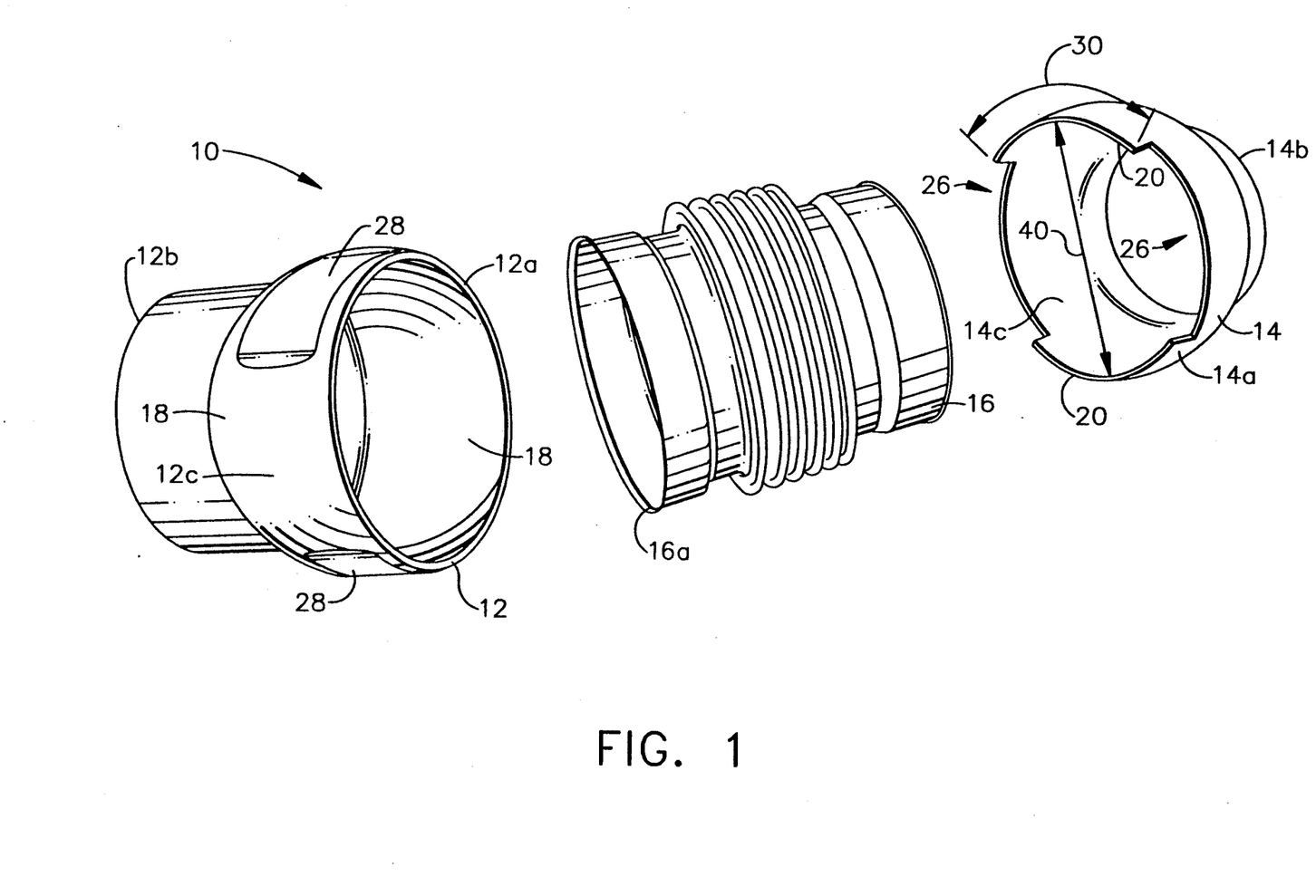
FIG. 1 is a exploded perspective view, showing an inner shell a bellows, and an outer shell.

FIG. 1 is an exploded view showing the components of a bellows sealed ball joint, hereinafter designated ball joint 10, according to one embodiment of this invention. The ball joint 10 may be used in line with any fluid carrier, such as a tube, duct or manifold (not shown) in a gas turbine or similar engine (not shown). The ball joint 10 comprises an inner spherical ball or shell 12, an outer spherical socket or shell 14 and a bellows 16. The inner spherical shell 12 comprises a first end 12a and a second end 12b. As beat shown in FIGS. 1 and 5, the first end 12a is generally spherically shaped and comprises a plurality of opposing spherical locking surfaces, designated generally as 18.

The outer spherical shell 14 comprises a first end 14a and a second end 14b. The first end 14a is also spherically shaped and comprises a second plurality of locking surfaces 20. The second plurality of locking surfaces 20 cooperate with the plurality of locking surfaces 18 in order to flexibly secure the outer spherical shell 14 to the inner spherical shell 12 after the inner and outer spherical shells 12 and 14 have been rotated to a locked position as described below. As best shown in the sectional view of FIG. 5, the first end 14a of the outer spherical shell 14 has an inner surface 14c which is dimensioned to be slightly larger than an outer surface 12c of first end 12a of the inner spherical shell 12, thereby enabling the inner spherical shell 12 to pivot freely within the outer spherical shell 14.

Figure 4:
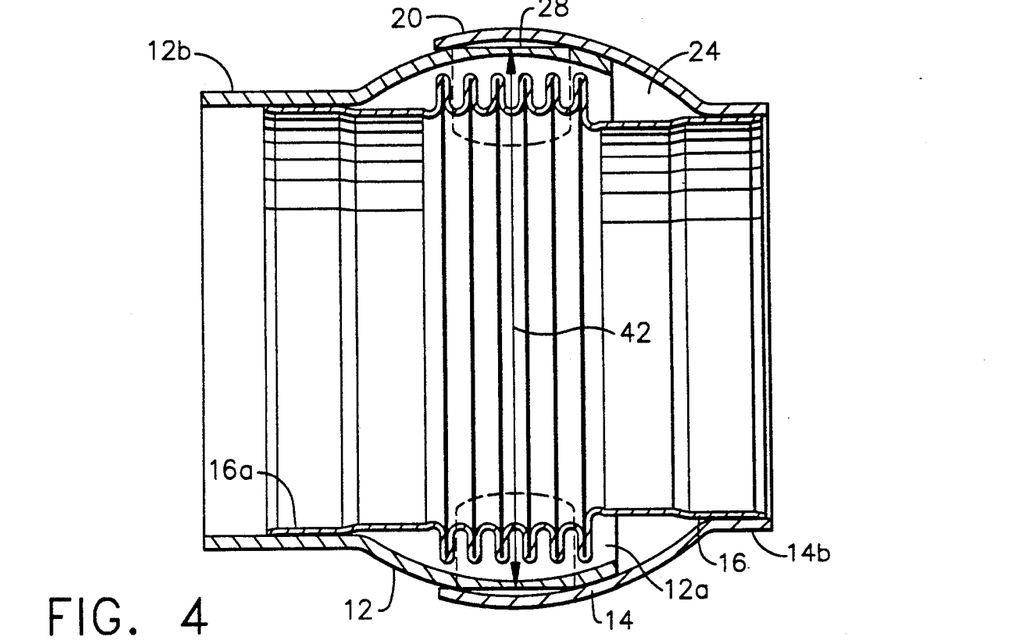
FIG. 4 is a sectional view of the bellows ball joint shown in FIG. 3.
Figure 5:
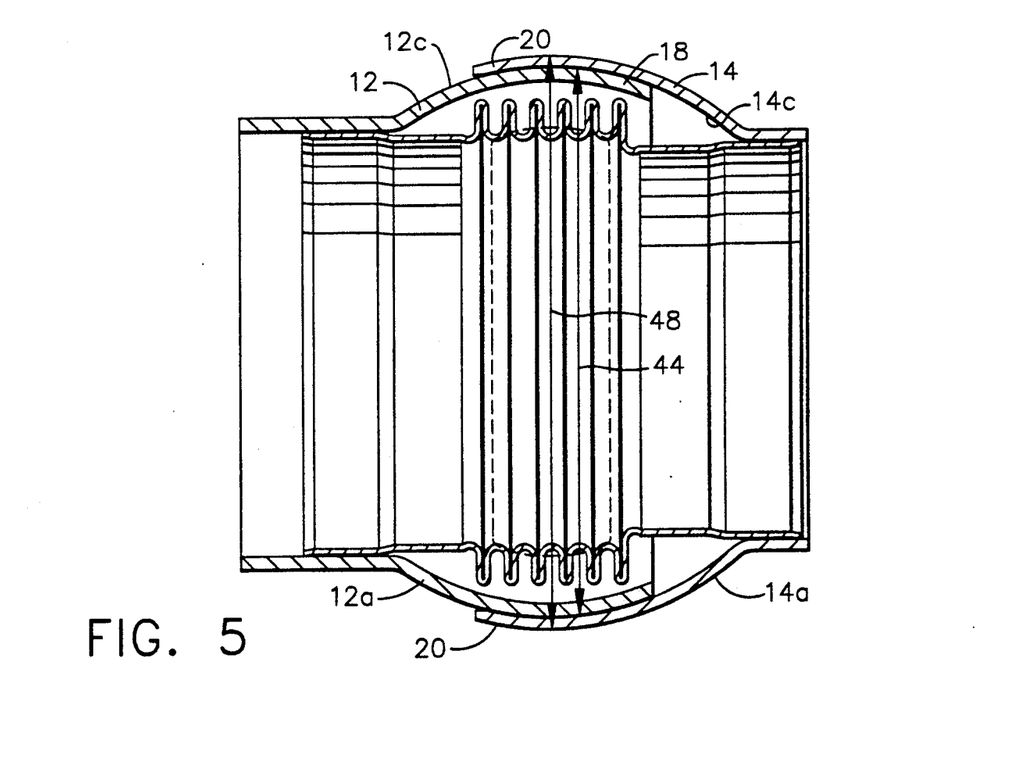
FIG. 5 is another sectional view of the bellows ball joint shown in FIG. 2, after the inner and outer portions have been rotated to the locked position.
Figure 6:
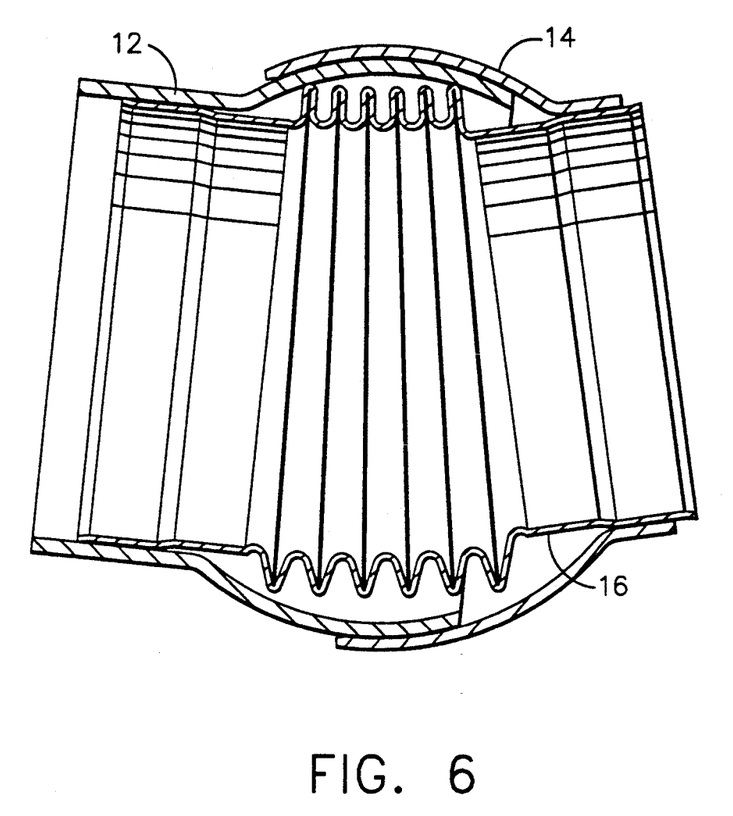
FIG. 6 is another sectional view similar to that of FIG. 4, showing an expanded and pivoted bellows ball joint.

As best shown in FIGS. 4–6, the inner and outer spherical shells 12 and 14 cooperate to define a chamber 24 in which the bellows 16 is encased. The second ends 12b and 14b of the inner spherical shell 12 and outer spherical shell 14, respectively, are generally cylindrical, and they may be integrally formed as part of the tubes, ducts or manifolds (not shown). Alternatively, these ends 12b and 14b could be secured to the tubes, ducts or manifolds by conventional means, such as by welding. As beat shown in FIG. 1, the first end 14a comprises a plurality of slots 26 which cooperate to define the second plurality of spherical locking surfaces 20.

As best illustrated in FIGS. 1 and 4, the inner spherical shell 12 comprises means for receiving the second plurality of spherical locking surfaces 20. In the embodiment described in FIGS. 1–6, receiving means comprises a plurality of indentations or elongated non-spherical areas 28 which are machined out of the outer surface 22 or are integrally formed as part thereof. The receiving means permits the inner and outer spherical shells 12 and 14 to become locked together after the second plurality of spherical locking surfaces 20 are received by the non-spherical areas 28 and the inner and outer spherical shells 12 and 14 have been rotated a predetermined distance. As beet illustrate in FIGS. 1 and 4, each of the elongated non-spherical areas 28 have a cylindrical arc length about the longitudinal axis of the inner spherical shell 12. Each of the second plurality of locking surfaces 20 have a cylindrical arc length 30. The cylindrical arc length 30 of each of the second plurality of locking surfaces 20 is equal to or less than the cylindrical arc lengths of the elongated non-spherical areas 28. The function and operation of the elongated non-spherical areas 28 and their cooperation with the second plurality of locking surfaces 20 will be described later herein. The operation and assembly of the embodiments described herein will now be described.

When it is desired to make a bellows ball joint connection, a first end 16a of the bellows 16 is slid inside the inner spherical shell 12 until the bellows 16 operably engages second end 12b of inner spherical shell 12. The first end 16a is then conventionally secured to second end 12b, for example, by a weld or braze.

Figure 3:
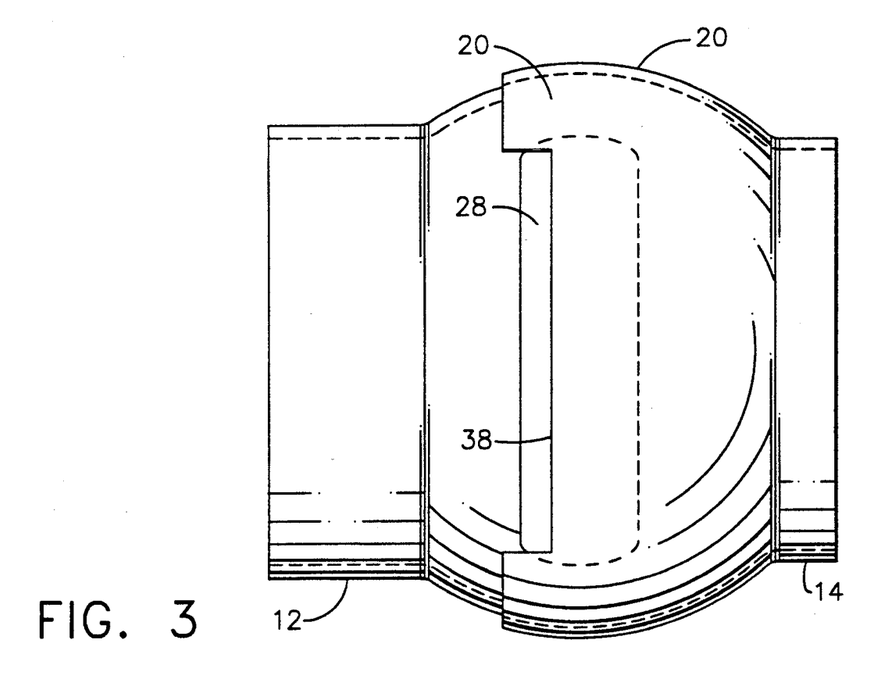
FIG. 3 is an assembled view of the bellows ball joint shown in FIG. 1, showing the inner and outer shells in a locked position.

Once the bellows 16 is properly positioned and mounted in the inner spherical shell 12, the outer spherical shell 14 is positioned in mating relationship with the inner spherical shell such that the second plurality of locking surfaces 20 on the outer spherical shell 14 are positioned opposite the elongated non-spherical areas 28. The outer spherical shell 14 is then slid over the inner spherical shell 12 until the second plurality of locking surfaces 20 are maneuvered over and in operative relationship with the elongated non-spherical areas 28, as best shown in FIGS. 3 and 4. It is to be noted that the plurality of spherical locking surfaces 18 on the inner spherical shell 12 become operatively positioned in opposed relationship with the plurality of slots 26. This facilitates positioning the second end 14a of outer spherical shell 14 over the first end 12a of inner spherical shell 12.

Figure 2:
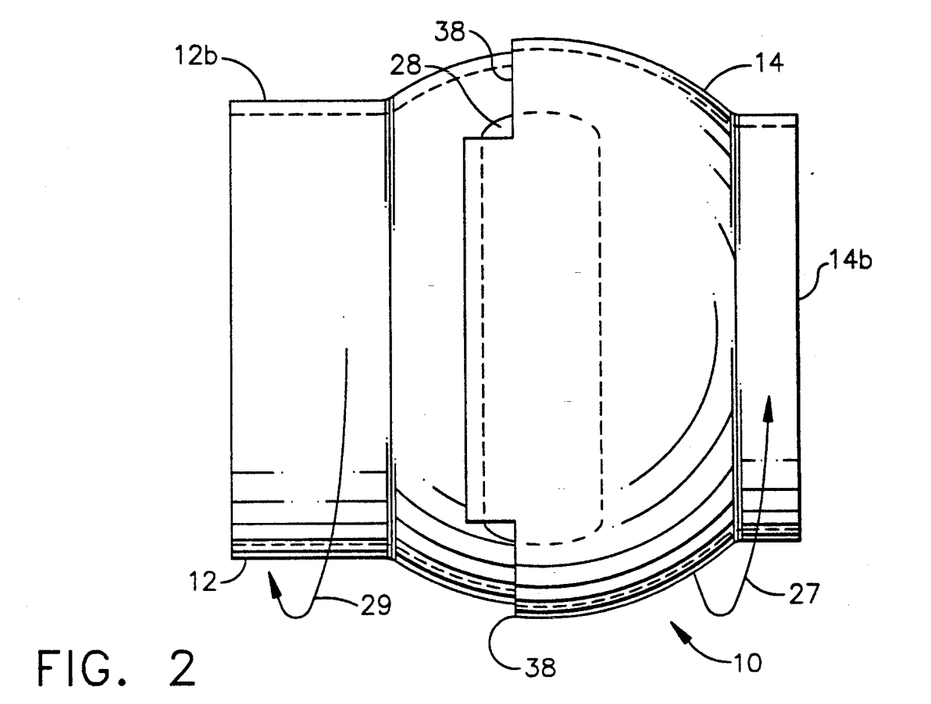
FIG. 2 is an assembled view of the bellows ball joint shown in FIG. 1, showing the inner and outer shells in an unlocked position.

Once the inner and outer spherical shells 12 and 14 are coupled together as shown in FIG. 2, they can be rotated with respect to each other, for example, in the direction of arrows 27 and 29. Once they have been rotated a predetermined distance, to the position shown in FIG. 3, the second plurality of locking surfaces 20 become operatively engaged and coupled with the plurality of spherical locking surfaces 18. In the embodiment being described, the predetermined distance is an angular distance of approximately 90 degrees. Note, however, that other angular distances are required when different number of elongated non-spherical areas 29 are employed. Once the inner and outer spherical shells have been rotated the predetermined distance, the bellows 16 becomes encased in the chamber 24. In addition, the inner and outer spherical shells 12 and 14 may be joined at their second ends 12a and 14a to the tube, duct or manifold thereby permanently retaining the inner and outer spherical shells 12 and 14 in a locked position.

It is to be noted that the outer spherical shell 14 has a minor diameter 40 (FIG. 1) and a major diameter 48 (FIG. 5). The inner spherical shell 12 has a major diameter 44 (FIG. 5) between the plurality of locking surfaces 18 and a minor diameter 42 (FIG. 4) between the non-spherical areas 28. The minor diameter 40 of outer spherical shell 14 is slightly larger than the minor diameter 42 of the inner spherical shell 12 so that the second plurality of locking surfaces 20 of the outer spherical shell 14 may be slid onto the non-spherical areas 28 of the inner spherical shell 12, as described above. As the inner and outer spherical shells 12 and 14, respectively, are rotated, the second plurality of locking surfaces 20 operatively engage the first plurality of locking surfaces 18. Because minor diameter 40 (FIG. 1) is smaller than the major diameter 44, the outer spherical shell 14 becomes pivotally locked onto the inner spherical shell 12. It is to be noted that the major diameter 48 is slightly larger than the major diameter 44 so that the inner and outer spherical shells 12 and 14 become pivotally locked with respect to each other, thereby providing a ball joint connection.

Figure 7:
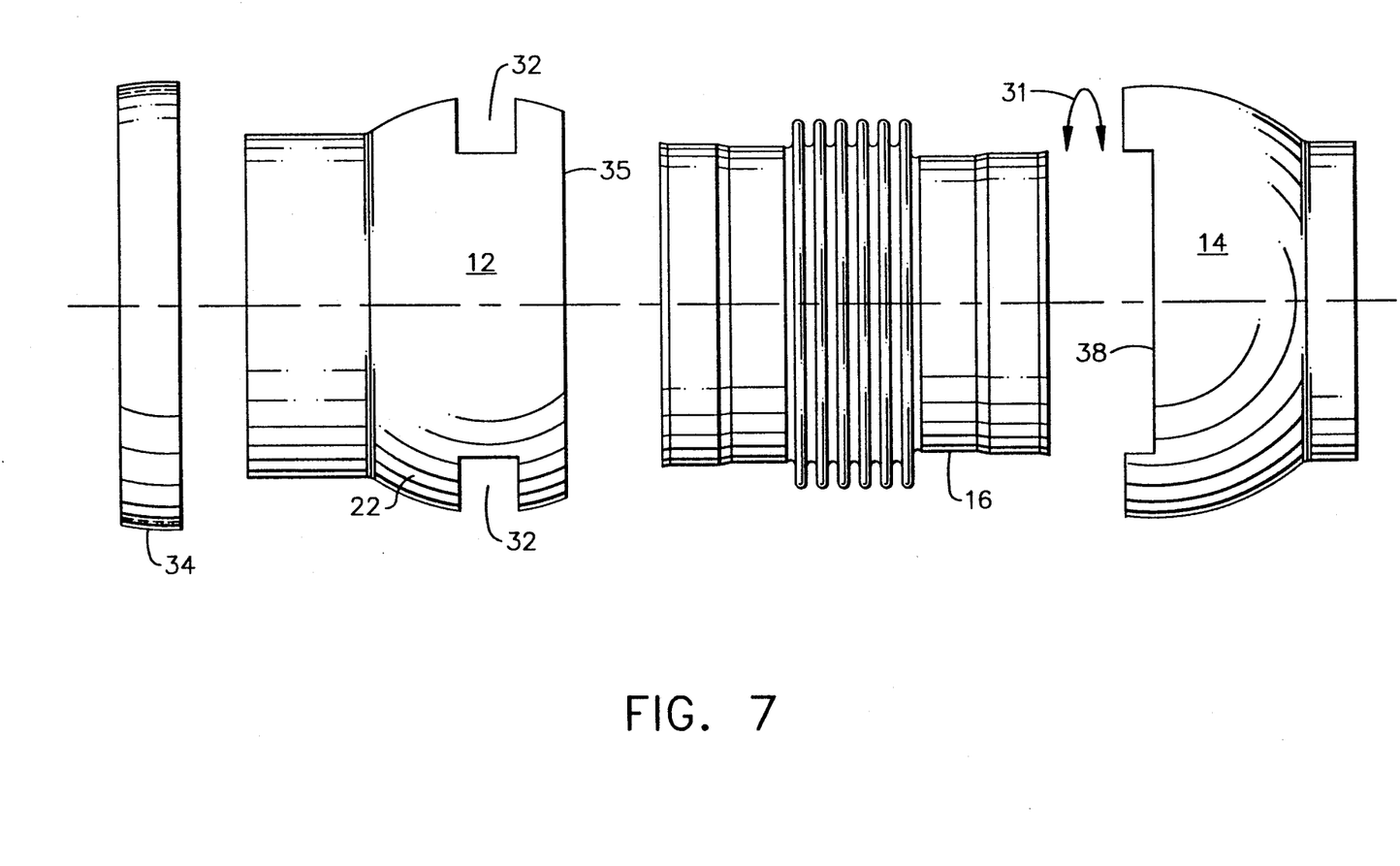
FIG. 7 is an exploded view of another embodiment of this invention showing the inner shell having a plurality of slots.
Figure 8:
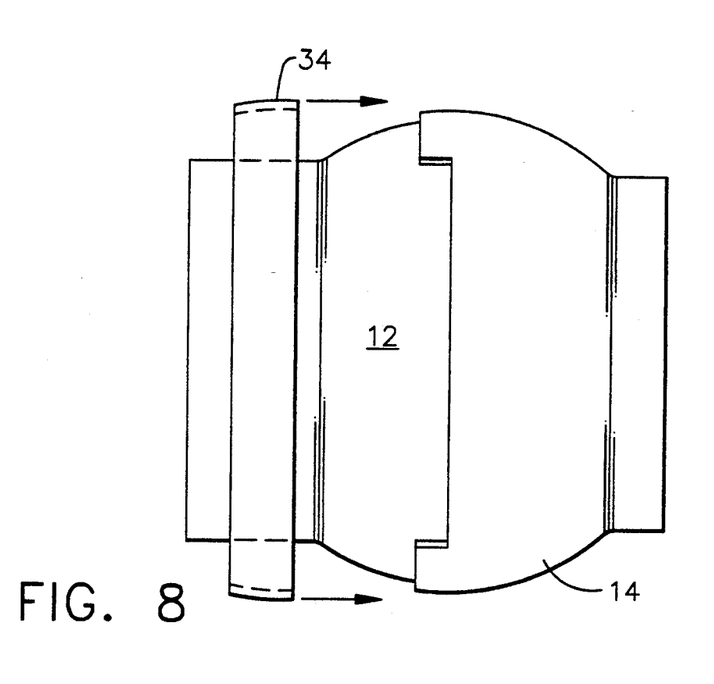
FIG. 8 is an assembled view of the embodiment shown in FIG. 7.

An alternate embodiment of the invention is shown in FIGS. 7 and 8, wherein the receiving means on the inner spherical shell 12 comprises a plurality of elongated apertures 32 extending through the outer surface 22, rather than the non-spherical areas 28 shown in FIG. 1. It is to be noted that the apertures 32 comprise an arc length which is equal to or greater than the arc length 31 of the mating outer spherical shell 14. As with the elongated non-spherical areas 28, the apertures 32 enable the second plurality of locking surfaces 20 to be slid over second end 12a of the inner spherical shell 12. It is to be noted that the apertures 32 could extend to an end 35 of the inner spherical member 12 if desired, as shown in FIG. 7.

As best shown in FIGS. 7 and 8, the ball joint 10 may also comprise a support ring 34 which becomes operatively positioned around the second plurality of locking surfaces 20 on the outer spherical shell 14. The strengthening support ring 34 facilitates supporting the second plurality of spherical locking surfaces against the first plurality of spherical locking surfaces 18 of the inner spherical shell 12. As shown, the support ring 34 is spherically shaped in order to conform to the shape of the second plurality of locking surfaces 20. Once it is operatively positioned on the outer spherical shell 14, it may be secured to the outer spherical shell 14 by a tack weld, braze or other conventional means.

Once the outer spherical shell 14 is mounted on inner spherical shell 12, the bellows 16 becomes incased in chamber 24. In the embodiment being described, the ball joint 10, as part of a ducting system, accommodates the thermal expansion by pivoting, as illustrated in FIG. 5. In order to enhance the pivotability of ball joint 10, it may be desired to slightly compress the bellows 16 when it is mounted between ends 12b and 14b of the inner and outer spherical shells 12 and 14, respectively. When the bellows 16 is slightly compressed between the second ends 12b and 14b, a lower bending moment is required to cause the ball joint 10 to pivot when the bellows 16 expands.

Advantageously then, the invention described herein provides a bellows sealed ball joint connection which does not require any catch hooks or special detents. In addition, the design of the present invention does not require either the use of catch hooks or that the outer spherical shell 14 be cut and then rewelded in order to assemble the bellows ball joint 10. This design also uses approximately 50% of the outer surface 12c of the inner spherical shell 12 and inner surface 38 of the outer spherical shell 14 for engagement. Accordingly, the loads and stresses on ball joint 10 will be carried over larger surface areas which, in turn, results in lower stresses on the bellows ball joint 10. The distribution of stress levels over larger areas allows thinner materials to be used which results in a lighter weight ball joint 10 which is most desirable in aerospace applications.

Various changes or modifications in the invention described may occur to those skilled in the art without departing from the spirit or scope of the invention. For example, axial elongation of the outer spherical segment will result in a bellows sealed joint which can accommodate axial movement in addition to angular movement. The above description of the invention is intended to be illustrative and not limiting, and it is not intended that the invention be restricted thereto but that it be limited only by the true spirit and scope of the appended claims.

What is claimed is:

1. A bellows sealed ball joint comprising:
   an inner spherical section comprising a first end and a second end, said first end being spherically shaped and having a first plurality of spherical locking surfaces;
   an outer spherical section comprising a first end and a second end, said first end of said outer spherical section being spherically shaped and having a second plurality of spherical locking surfaces, said inner and outer spherical sections cooperating to define a chamber when said outer spherical section is mounted on said inner spherical section;
   a bellows for mounting in said chamber between said second ends of said inner and outer spherical members, respectively; and
   means located on said inner spherical section for receiving said second plurality of spherical locking surfaces in order to permit said inner and outer spherical sections to become locked when they are rotated a predetermined distance with respect to each other, thereby encasing the bellows in said chamber.

2. The bellows sealed ball joint as recited in claim 1 wherein said first end of said outer spherical section comprises a plurality of slots adjacent said second plurality of spherical locking surfaces.

3. The bellows sealed ball joint as recited in claim 1 wherein said means comprises a plurality of indentations which define elongated non-spherical areas on an outer surface of said inner spherical section.

4. The bellows sealed ball joint as recited in claim 3 wherein each of said plurality of spherical locking surfaces comprise a cylindrical arc length about the longitudinal axis of said inner spherical section and each of said elongated non-spherical areas comprise a cylindrical arc length about the longitudinal axis of said inner spherical member, whereby said cylindrical arc lengths of said plurality of spherical locking surfaces are equal to or less than the cylindrical arc lengths of said elongated non-spherical areas.

5. The bellows sealed ball joint as recited in claim 1 wherein said means comprises a plurality of elongated apertures.

6. The bellows sealed ball joint as recited in claim 1 wherein said bellows is metallic.

7. The bellows sealed ball joint as recited in claim 1 further comprising a support ring for positioning on said outer spherical member in order to add strength and support said second plurality of spherical locking surfaces against a first plurality of spherical locking surfaces of said inner spherical member.

8. A bellows sealed ball joint for use in an aircraft or similar engine, comprising:
   an outer shell having a first end and second end, said first end being spherical and having a plurality of slots which define a first spherical locking surface and a second spherical locking surface;
   an inner shell having a first end and a second end, said first end being spherical and having a first receiving area and a second receiving area for receiving said first and second spherical locking surfaces, respectively, said inner shell also comprising a third locking surface and a fourth locking surface; and
   a bellows for mounting inside said inner and outer shells between said second ends;
   said first and second receiving areas being capable of receiving said first and second locking surfaces, respectively, in order to permit said outer shell to be mounted on said inner shell so that the first and second locking surfaces can operatively engage the third and fourth locking surfaces, respectively, when the inner and outer shells are rotated with respect to each other a predetermined amount, thereby providing a ball joint connection between said inner and outer shells.

9. The bellows sealed ball joint as recited in claim 8 wherein said first and second receiving areas have a first arc length and a second arc length, respectively;
   said first and second spherical locking surfaces having a third arc length and a fourth arc length, respectively;
   said first and second arc lengths being greater than or equal to said third and fourth arc lengths, respectively.

10. The bellows sealed ball joint as recited in claim 9 wherein said first and second receiving areas are non-spherical.

11. The bellows sealed ball joint as recited in claim 9 wherein said first and second receiving areas are elongated apertures in said inner spherical section.

12. The bellows sealed ball joint as recited in claim 9 wherein said bellows is metallic.

13. The bellows sealed ball joint as recited in claim 9 further comprising a support ring for positioning on said outer shell to add strength and support said first and second spherical locking surfaces on the outer spherical shell against the third and fourth locking surfaces of the inner spherical shell.

* * * * *